United States Patent
Suzuki et al.

(10) Patent No.: US 9,467,084 B2
(45) Date of Patent: Oct. 11, 2016

(54) MOTOR-DRIVEN APPLIANCE SYSTEM AND METHOD FOR CONTROLLING THE SYSTEM

(71) Applicant: MAKITA CORPORATION, Anjo-shi, Aichi (JP)

(72) Inventors: Hitoshi Suzuki, Anjo (JP); Masafumi Noda, Anjo (JP); Masaaki Fukumoto, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 169 days.

(21) Appl. No.: 14/225,669

(22) Filed: Mar. 26, 2014

(65) Prior Publication Data
US 2014/0292245 A1    Oct. 2, 2014

(30) Foreign Application Priority Data
Mar. 28, 2013 (JP) ................... 2013-069316

(51) Int. Cl.
H02P 7/00 (2016.01)
H02P 23/00 (2016.01)
B25F 5/00 (2006.01)

(52) U.S. Cl.
CPC ............. *H02P 23/0036* (2013.01); *B25F 5/00* (2013.01); *H02P 23/0004* (2013.01)

(58) Field of Classification Search
CPC ....... B25F 5/00; G08C 17/02; H02P 23/0036
USPC ............. 318/478, 400.09, 400.26, 265, 267, 318/438; 340/870.07, 3.71, 4.1, 10.1, 340/10.33, 10.4, 10.41
See application file for complete search history.

(56) References Cited

U.S. PATENT DOCUMENTS 4,791,344 A * 12/1988 Yoshida ................... D05B 9/22
112/221

5,105,130 A * 4/1992 Barker ................... B23B 45/02
318/268

(Continued)

FOREIGN PATENT DOCUMENTS

EP    2 237 361 A1    10/2010
EP    2 472 666 A1    7/2012

(Continued)

OTHER PUBLICATIONS

Extended European Search Report issued in European Application No. 14161908.0 dated Oct. 1, 2014.

(Continued)

*Primary Examiner* — Bentsu Ro
*Assistant Examiner* — Thai Dinh
(74) *Attorney, Agent, or Firm* — Oliff PLC

(57) ABSTRACT

A motor-driven appliance system in one aspect of an embodiment of the present disclosure includes a motor-driven appliance having a motor, at least one control circuit, and a communication device. The control circuit is configured to execute a process related to control of the motor-driven appliance. The communication device is configured to communicate with an external device. The control circuit is further configured to switch, when at least one predetermined sleep condition is satisfied, from an active mode in which the control circuit performs a normal operation to a sleep mode in which the control circuit stops part of the normal operation to thereby suppress power consumption; and to switch to the active mode when the communication device receives an external wakeup signal transmitted from the external device while the control circuit is in the sleep mode.

18 Claims, 10 Drawing Sheets

(56) References Cited

U.S. PATENT DOCUMENTS

| | | | |
|---|---|---|---|
| 7,346,422 B2* | 3/2008 | Tsuchiya | B23D 59/008 700/168 |
| 7,504,792 B2* | 3/2009 | Pellarin | G01D 18/008 318/268 |
| 2001/0010455 A1* | 8/2001 | Brotto | H02J 7/0004 320/106 |
| 2010/0084150 A1 | 4/2010 | Suzuki et al. | |
| 2010/0181964 A1 | 7/2010 | Huggins et al. | |
| 2012/0166847 A1 | 6/2012 | Noda et al. | |
| 2013/0033790 A1* | 2/2013 | Kobayakawa | H01M 10/44 361/87 |
| 2014/0151079 A1 | 6/2014 | Furui et al. | |
| 2014/0158389 A1 | 6/2014 | Ito et al. | |
| 2014/0159919 A1* | 6/2014 | Furui | B25F 5/02 340/870.07 |

FOREIGN PATENT DOCUMENTS

| | | | |
|---|---|---|---|
| JP | H08-336187 A | 12/1996 | |
| JP | A-2010-158743 | 7/2010 | |
| WO | WO 2013/014890 A2 | 1/2013 | |
| WO | WO 2013/014914 A2 | 1/2013 | |
| WO | WO 2013014914 A2 * | 1/2013 | B25F 5/02 |

OTHER PUBLICATIONS

Jul. 5, 2016 Office Action issued in Japanese Patent Application No. 2013-069316.

* cited by examiner

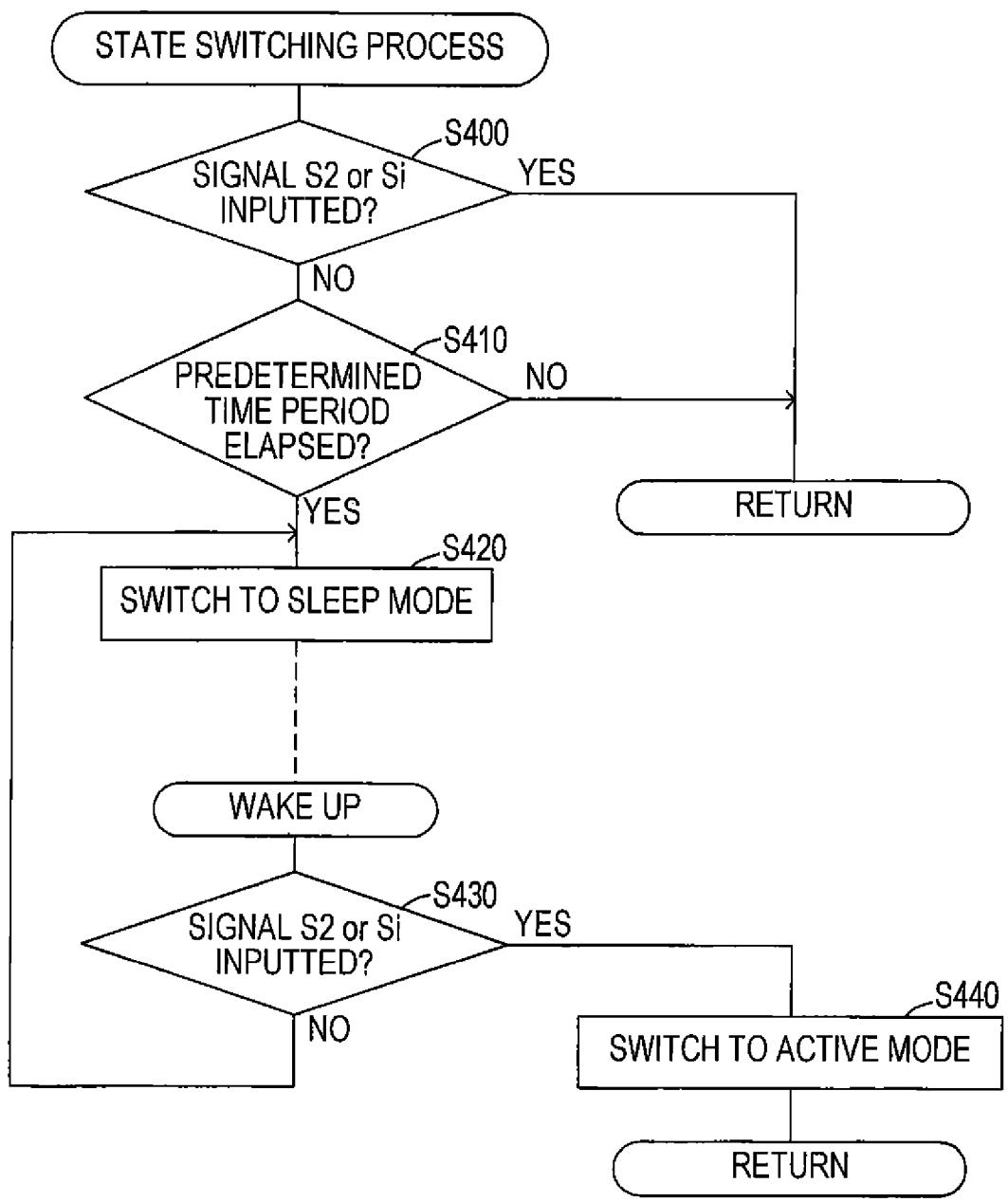

MOTOR-DRIVEN APPLIANCE SYSTEM AND METHOD FOR CONTROLLING THE SYSTEM

CROSS-REFERENCE TO RELATED APPLICATIONS

This application claims the benefit of Japanese Patent Application No. 2013-069316 filed Mar. 28, 2013 in the Japan Patent Office, and the entire disclosure of Japanese Patent Application No. 2013-069316 is incorporated herein by reference.

BACKGROUND

The present invention relates to a motor-driven appliance system and a method for controlling the system.

A motor-driven appliance system, including an electric power tool, an electric work machine, or the like, is provided with a control circuit to control an operation of the motor-driven appliance system, as disclosed, for example, in Japanese Unexamined Patent Application Publication No. 2010-158743.

The motor-driven appliance system of this type is configured such that, for example, when an operation of the motor-driven appliance is stopped, an operation mode of the control circuit is switched from an active mode, in which a normal operation is performed, to a sleep mode, in which part of the normal operation is suspended, to thereby reduce power consumption.

More specifically, the motor-driven appliance system of this type is configured such that the operation mode of the control circuit is switched from the sleep mode to the active mode in response to a user's operation of a main switch provided in the motor-driven appliance.

SUMMARY

In the aforementioned motor-driven appliance system, in a case, for example, where the control circuit is configured to control the motor-driven appliance by means of communication with an external device, it is required for the user to operate the main switch, once the control circuit has switched to the sleep mode, in order to afterwards enable the control circuit to control the motor-driven appliance. This leads to a disadvantage of reduced usability of the aforementioned motor-driven appliance system.

In one aspect of an embodiment of the present disclosure, it is preferable that a control circuit of a motor-driven appliance in a sleep mode can be easily switched to an active mode without requiring an operation by a user.

A motor-driven appliance system in one aspect of an embodiment of the present disclosure includes a motor-driven appliance having a motor, at least one control circuit, and a communication device. The at least one control circuit is configured to execute a process related to control of the motor-driven appliance. The communication device is configured to perform communication with an external device. The at least one control circuit is further configured to switch, when at least one predetermined sleep condition is satisfied, from an active mode in which the at least one control circuit performs a normal operation to a sleep mode in which the at least one control circuit stops part of the normal operation to thereby suppress power consumption; and to switch to the active mode when the communication device receives an external wakeup signal transmitted from the external device while the at least one control circuit is in the sleep mode.

According to the motor-driven appliance system with such configuration, it is possible to reduce power consumption by switching the at least one control circuit from the active mode to the sleep mode.

More specifically, in a case, for example, where the motor-driven appliance system operates by receiving alternating-current power from an external power source, it is possible to reduce standby power in the at least one control circuit. In a case where the motor-driven appliance system operates by receiving direct-current power from a battery, it is possible to reduce discharging power from the battery, to thereby lengthen a usable time of the battery.

The at least one control circuit switches to the active mode when the communication device receives an external wakeup signal transmitted from the external device while the at least one control circuit is in the sleep mode.

According to the motor-driven appliance system with such configuration, it is possible to switch the at least one control circuit from the sleep mode to the active mode by means of an external wakeup signal from the external device without an operation of a switch provided in the motor-driven appliance by the user of the motor-driven appliance.

Accordingly, in a case, for example, where the external device is a portable terminal owned by the user, the user can switch the at least one control circuit to the active mode using the portable terminal, and thereby cause the at least one control circuit to execute the process related to control of the motor-driven appliance.

The at least one control circuit may include a first control circuit and a second control circuit. The first control circuit may be configured to switch to the active mode when the communication device receives an external wakeup signal while the first control circuit is in the sleep mode, and to output a first wakeup signal to the second control circuit.

The second control circuit may be configured to switch to the active mode when the second control circuit receives the first wakeup signal from the first control circuit while the second control circuit is in the sleep mode.

According to the motor-driven appliance system with such configuration, when the communication device receives an external wakeup signal, the first control circuit and the second control circuit sequentially switch to the active mode, and afterwards each of the first control circuit and the second control circuit can perform good communication to control the motor-driven appliance.

The motor-driven appliance may include a switch configured to be operated by the user of the motor-driven appliance. The switch may be further configured to output a second wakeup signal to the second control circuit when operated by the user.

The second control circuit may be configured to switch to the active mode when receiving the second wakeup signal from the switch while the second control circuit is in the sleep mode, and to output a third wakeup signal to the first control circuit.

The first control circuit may be configured to switch to the active mode when receiving the third wakeup signal from the second control circuit while the first control circuit is in the sleep mode.

According to the motor-driven appliance system with such configuration, it is possible to switch the first control circuit and the second control circuit from the sleep mode to the active mode also by an operation of the switch by the user in a same manner as in the aforementioned conventional system.

When the switch is operated by the user, the second control circuit and the first control circuit switch to the active mode in this order. In this case, the third wakeup signal outputted by the second control circuit to the first control circuit may be transmitted through the same signal path as the first wakeup signal outputted by the first control circuit to the second control circuit.

In this case, if the first control circuit and the second control circuit are provided in the same housing, such as the motor-driven appliance, it is possible to reduce wiring between the first control circuit and the second control circuit, to thereby suppress a manufacturing cost.

In a case where the first control circuit and the second control circuit are provided separately, for example, in the communication device and the motor-driven appliance, respectively, it is possible to reduce the number of connection terminals to be provided in the communication device and the motor-driven appliance in addition to reducing the wiring between the first control circuit and the second control circuit.

The switch may be any switch to be operated by a user, and may be configured, for example, to be operated by a user in order to drive the motor. In this case, it is possible to switch the first control circuit and the second control circuit from the sleep mode to the active mode when the user drives the motor.

The at least one control circuit may include a third control circuit. The second control circuit may be configured to output a fourth wakeup signal to the third control circuit when the second control circuit switches from the sleep mode to the active mode. The third control circuit may be configured to switch to the active mode when receiving the fourth wakeup signal from the second control circuit while the third control circuit is in the sleep mode.

In this case, it is possible to switch the first control circuit, the second control circuit, and the third control circuit to the active mode in this order by means of an external wakeup signal from the external device.

Alternatively, in addition to switching the first control circuit, the second control circuit, and the third control circuit to the active mode in this order by means of an external wakeup signal from the external device, it is possible to switch the first control circuit and the third control circuit to the active mode in this order after switching the second control circuit to the active mode by means of a switching operation.

In this case, signal paths for wakeup signals to be used to sequentially switch the respective control circuits to the active mode may be shared between a situation of an external wakeup signal being received and a situation of the switch being operated. Thus, it is possible to reduce the number of wirings and the number of connection terminals among the control circuits, to thereby reduce manufacturing cost.

The switch may be further configured to directly input a second wakeup signal to each of the first control circuit and the second control circuit when operated by the user. Each of the first control circuit and the second control circuit may be configured to switch to the active mode when receiving the second wakeup signal from the switch while the each of the first control circuit and the second control circuit is in the sleep mode.

According to the motor-driven appliance system with such configuration, it is possible, by directly inputting the second wakeup signal outputted from the switch to the each of the first control circuit and the second control circuit, to switch the control circuits to the active mode simultaneously and promptly instead of sequentially switching the control circuits to the active mode after the switch is operated.

That is, according to the motor-driven appliance system, it is possible to sequentially wake up the control circuits when receiving an external wakeup signal, to thereby facilitate good communication among the control circuits after wakeup, and on the other hand to promptly switch the control circuits (and thus the motor-driven appliance system) to the active mode, when the switch is operated by the user, to thereby suppress giving an uncomfortable feeling to the user due to a delayed activation of the system after the switch is operated.

Also, each of the control circuits may be provided with, for example, an input port for a second wakeup signal and configured to switch to the active mode when a second wakeup signal is inputted to the input port, resulting in a simplified configuration of the control circuits.

The communication device may be configured to directly input an internal wakeup signal to each of the first control circuit and the second control circuit when receiving an external wakeup signal transmitted from the external device. The first control circuit and the second control circuit may be configured to switch to the active mode when receiving the internal wakeup signal from the communication device while the first control circuit and the second control circuit are in the sleep mode.

According to the motor-driven appliance system with such configuration, the first control circuit and the second control circuit switch to the active mode simultaneously and promptly when the communication device receives an external wakeup signal. Thus, it is possible to suppress giving an uncomfortable feeling to the user of the external device due to a delayed activation of the system after the external wakeup signal is transmitted.

Also, since the each of the control circuits may be, for example, provided with an input port for an internal wakeup signal and configured to switch to the active mode when an internal wakeup signal is inputted to the input port, a simplified configuration of the control circuits can be achieved.

Each of the first control circuit and the second control circuit may be configured to switch to the active mode when the switch is operated by the user while the first control circuit and the second control circuit are in the sleep mode.

According to the motor-driven appliance system with such configuration, it is possible to switch the control circuits from the sleep mode to the active mode by means of an operation of the switch by the user in a similar manner as in the aforementioned conventional system.

In case of switching the first control circuit and the second control circuit to the active mode in conjunction with a switching operation by the user, it may be configured such that a second wakeup signal is outputted from the switch to the second control circuit to thereby switch the second control circuit to the active mode, and subsequently the first control circuit switches to the active mode.

Alternatively, it may be configured such that a second wakeup signal is directly inputted from the switch to the first control circuit and the second control circuit, to thereby switch both of the control circuits to the active mode simultaneously.

The third control circuit may be configured to switch to the active mode in conjunction with switching of each of the first control circuit and the second control circuit to the active mode while the third control circuit is in the sleep mode.

According to the motor-driven appliance system configured as above, even when the motor-driven appliance system has a larger size and therefore includes an increased number of control circuits, all of the control circuits can be switched to the active mode simultaneously.

In this case, the third control circuit may be configured to switch to the active mode when receiving a fourth wakeup signal from the second control circuit, or may be configured to switch to the active mode when receiving an internal wakeup signal outputted from the communication device.

Alternatively, in a case where the motor-driven appliance is provided with a switch, the third control circuit may be configured to switch to the active mode when receiving a second wakeup signal outputted from the switch.

That is, with such configuration, the third control circuit promptly switches to the active mode when an external wakeup signal is transmitted from the external device, and when the switch is operated by the user, to thereby suppress giving an uncomfortable feeling to the user due to a delayed activation of the system.

Another aspect of an embodiment of the present disclosure is a method for controlling a motor-driven appliance system including a motor-driven appliance having a motor, at least one control circuit configured to execute a process related to control of the motor-driven appliance, and a communication device configured to perform communication with an external device.

The controlling method includes switching the at least one control circuit from an active mode to a sleep mode when predetermined sleep conditions are satisfied. The active mode is a mode in which the at least one control circuit performs a normal operation, and the sleep mode is a mode in which the at least one control circuit stops part of the normal operation to thereby suppress power consumption in the at least one control circuit.

The control method further includes receiving an external wakeup signal transmitted from the external device through the communication device.

The control method further includes switching the at least one control circuit to the active mode when the external wakeup signal transmitted from the external device is received through the communication device while the at least one control circuit is in the sleep mode.

According to such control method, it is possible to switch the at least one control circuit from the sleep mode to the active mode by means of an external wakeup signal from the external device without an operation of a switch provided in the motor-driven appliance by a user of the motor-driven appliance.

In a case where the motor-driven appliance is provided with a switch configured to be operated by the user of the motor-driven appliance, the control method may further include switching the at least one control circuit to the active mode when the switch is operated while the at least one control circuit is in the sleep mode.

According to such control method, it is possible to switch the at least one control circuit from the sleep mode to the active mode also by means of an operation of the switch by the user.

The switch may be any type of switch that is operated by a user, and may be configured, for example, to be operated by the user in order to drive the motor. In this case, it is possible to switch the at least one control circuit from the sleep mode to the active mode when the user drives the motor.

BRIEF DESCRIPTION OF THE DRAWINGS

Exemplary embodiments will now be described by way of example with reference to the accompanying drawings, in which:

FIG. 10 is a flowchart showing a state switching process in an adapter, an electric power tool, and a battery pack of the third embodiment.

DETAILED DESCRIPTION OF THE PREFERRED EMBODIMENTS

First Embodiment

Figure 1:
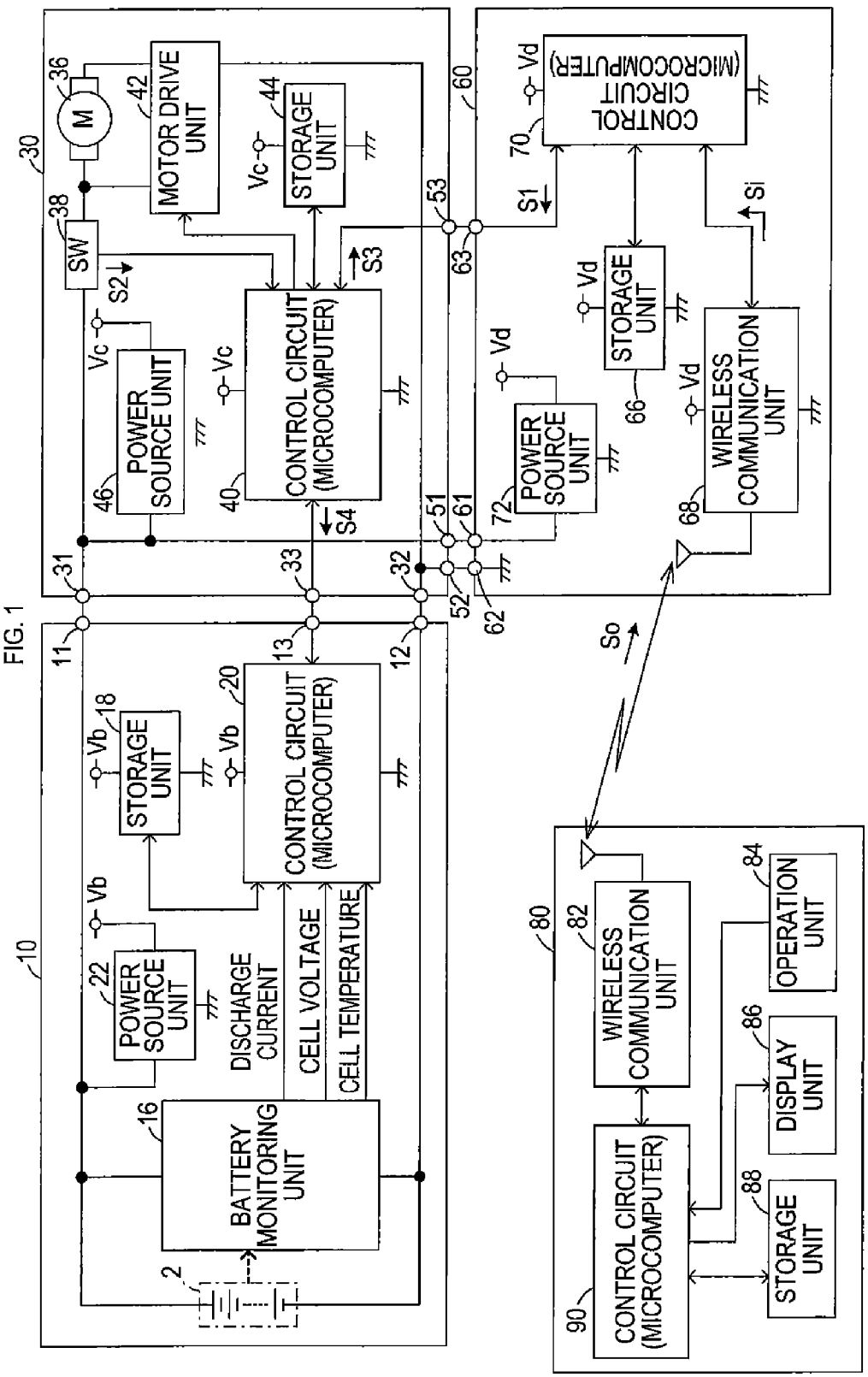
FIG. 1 is a block diagram showing a configuration of an electric power tool system in a first embodiment.

As shown in FIG. 1, an electric power tool 30, to which a battery pack 10 is detachably attached, operates by receiving power supply from the attached battery pack 10.

Also, it is possible to connect to the electric power tool 30 an adapter 60 for communication that performs wireless communication with an external device 80. When the adapter 60 is connected to the electric power tool 30, the electric power tool 30 can perform wireless communication with the external device 80 through the adapter 60.

The battery pack 10 is provided with a battery 2 including a plurality of cells that are connected in series. The plurality of cells are configured to be chargeable and dischargeable.

A positive electrode side and a negative electrode side of the battery 2 are connected to a terminal 11 and a terminal 12, respectively, which are to be connected to a terminal 31 on a positive electrode side and a terminal 32 on a negative electrode side, respectively, of the electric power tool 30 when the battery pack 10 is attached to the electric power tool 30.

Accordingly, once the battery pack 10 is attached to the electric power tool 30, power supply from the battery 2 to the electric power tool 30 can be provided through the terminals 11 and 12, and the terminals 31 and 32 of the electric power tool 30.

The battery pack 10 is also provided with a battery monitoring unit 16 that detects a voltage (a cell voltage) and a temperature (a cell temperature) of each of the cells in the battery 2, a discharge current flowing from the battery 2 to the electric power tool 30, and the like.

Detected signals of the cell voltage, the cell temperature, the discharge current, and the like detected by the battery monitoring unit 16 are inputted to the control circuit 20.

The control circuit 20 is designed to perform a control of determining whether the battery 2 is normal based on the detected signals from the battery monitoring unit 16; and to perform a control of permitting discharge to the electric power tool 30 (in other words, driving of the electric power tool) when the battery 2 is normal, or, on the contrary, to perform a control of stopping driving of the electric power tool 30 when the battery 2 is abnormal.

The control circuit 20 in the first embodiment includes a microcomputer, including a CPU, a ROM, and a RAM. The control circuit 20 is connected to a terminal 33 of the electric power tool 30 through a terminal 13 for communication when the battery pack 10 is attached to the electric power tool 30.

As a result, the control circuit 20 can perform data communication with a control circuit 40 in the electric power tool 30.

The battery pack 10 is further provided with a storage unit 18 and a power source unit 22. The storage unit 18 is designed to store histories of control by the control circuit 20 as well as a variety of data. The power source unit 22 is designed to receive power supply from the battery 2 and to generate a power supply voltage Vb to drive circuits (including the control circuit 20, the storage unit 18, and the like) in the battery pack 10.

The electric power tool 30 is provided with a direct-current motor (hereinafter, simply referred to as the "motor") 36 as a power source. The motor 36 is provided on a current conduction path to receive power supply from the battery 2 in the battery pack 10 through the terminals 31 and 32 and the terminals 11 and 12.

There are also provided, on the current conduction path, a main switch 38 to be turned on/off by user operation and a motor drive unit 42 to drive the motor 36.

The motor drive unit 42 includes a switching device to turn on/off the current conduction path to the motor 36, and the control circuit 40 drives the switching device in the motor drive unit 42 to thereby control a conduction current to the motor 36 (and thus control rotation of the motor 36).

The control circuit 40, which includes a microcomputer in the similar manner as the control circuit 20 in the battery pack 10, drive-controls the motor 36 through the motor drive unit 42 when the main switch 38 is in an ON state and a permission signal is inputted from the control circuit 20 in the battery pack 10 through the terminals 13 and 33.

The electric power tool 30 is also provided with a storage unit 44 and a power source unit 46. The storage unit 44 is designed to store histories of control by the control circuit 40 as well as a variety of data. The power source unit 46 is designed to receive power supply from the battery 2 and to generate a power supply voltage Vc to drive circuits (including the control circuit 40, the storage unit 44, and the like) in the electric power tool 30.

The electric power tool 30 is further provided with terminals 51 and 52 as well as a terminal 53 for communication. The terminals 51 and 52 are designed to output, to the adapter 60, a battery voltage inputted from the battery pack 10 to the terminals 31 and 32. The terminal 53 is designed to connect the control circuit 40 and a control circuit 70 provided in the adapter 60.

That is, the electric power tool 30 and the adapter 60 are interconnected through the terminals 51, 52, and 53 in the electric power tool 30, and the terminals 61, 62, and 63 provided in the adapter 60 so as to correspond to the terminals 51, 52, and 53, respectively, and the battery voltage is supplied to the adapter 60 through the electric power tool 30.

The adapter 60 is provided with a wireless communication unit 68 to perform wireless communication with the external device 80. The control circuit 70 in the adapter 60 performs wireless communication with the external device 80 through the wireless communication unit 68, to thereby transmit, to the external device 80, states of the electric power tool 30 and the battery pack 10 in response to a request from the external device 80.

The control circuit 70 includes a microcomputer in the similar manner as each of the control circuits 20 and 40. The adapter 60 is also provided with a storage unit 66 and a power source unit 72. The storage unit 66 is designed to store histories of communication by the control circuit 70 as well as a variety of data. The power source unit 72 is designed to receive the battery voltage inputted through the terminals 61 and 62 and to generate a power supply voltage Vd to drive circuits (including the control circuit 70, the storage unit 66, the wireless communication unit 68, and the like) in the adapter 60.

The external device 80, which is, for example, a portable information processing terminal (such as, a laptop computer, a tablet, a smartphone, and the like) owned by a user of the electric power tool 30, is provided with a wireless communication unit 82 to perform wireless communication with the adapter 60 (specifically the wireless communication unit 68).

The external device 80 is also provided with an operation unit 84 through which the user performs input operation, a display unit 86 to display various information that includes an LCD, and other components, a storage unit 88 to store various information, and a control circuit 90 including a microcomputer.

The control circuit 90 transmits a signal requesting various information, such as an operation history of the electric power tool 30, from the wireless communication unit 82 to the adapter 60 in accordance with a command inputted by the user through the operation unit 84 or with a preset control program, and thereby obtains desired information of the electric power tool system through the adapter 60. The control circuit 90 also displays the obtained information on the display unit 86 and stores the obtained information in the storage unit 88.

In the electric power tool system of the first embodiment configured as described above, the control circuit 20 in the battery pack 10, the control circuit 40 in the electric power tool 30, and the control circuit 70 in the adapter 60 operate receiving the power supply voltages Vb, Vc, and Vd, respectively, which are generated by the power source units 22, 46, and 72, respectively.

The power source units 22, 46, and 72 generate the respective power supply voltages Vb, Vc, and Vd using the battery voltage supplied from the battery 2 in the battery pack 10. Accordingly, in a case where normal operation of the control circuits 20, 40, and 70 is performed even when the electric power tool 30 need not be driven, an electric power of the battery 2 will be consumed wastefully and a usable life of the battery 2 after full charging will be shortened.

Therefore, the first embodiment is designed such that, if operation of the main switch 38 and signal transmission from the external device 80 have been stopped for a predetermined time or more, each of the control circuits 20, 40, and 70 switches its own operation mode from a normal active mode to a sleep mode, to thereby stop execution of a control process and suppress its own power consumption.

When the main switch 38 is operated or a signal for wakeup is transmitted from the external device 80 while the control circuits 20, 40, and 70 are in the sleep mode, the control circuits 20, 40, and 70 each wake up and switch to the normal active mode, in which a predetermined control process is restarted.

Specifically, in the first embodiment, when a signal for wakeup (an external wakeup signal) So is transmitted from the wireless communication unit 82 of the external device 80 while the control circuits 20, 40, and 70 are each in the sleep mode and operation of the entire electric power tool system is stopped, the wireless communication unit 68 in the adapter 60 receives the external wakeup signal So.

Then, the wireless communication unit 68 outputs an internal wakeup signal Si to the control circuit 70 through a communication path with the control circuit 70.

When the internal wakeup signal Si is inputted through the communication path with the wireless communication unit 68, the control circuit 70 wakes up by a wakeup circuit in the control circuit 70 and switches to the active mode to execute a predetermined control process.

After switching to the active mode, the control circuit 70 transmits a first wakeup signal S1 to the control circuit 40 in the electric power tool 30 using a communication path formed through the terminals 63 and 53.

When the first wakeup signal S1 is inputted through the communication path with the control circuit 70, the control circuit 40 wakes up by a wakeup circuit in the control circuit 40 and switches to the active mode to execute a predetermined control process. After switching to the active mode, the control circuit 40 transmits a fourth wakeup signal S4 to the control circuit 20 in the battery pack 10 using a communication path formed through the terminals 33 and 13.

When the fourth wakeup signal S4 is inputted through the communication path with the control circuit 40, the control circuit 20 wakes up by a wakeup circuit in the control circuit 20 and switches to the active mode to execute a predetermined control process.

According to the electric power tool system of the first embodiment, therefore, when an external wakeup signal So is transmitted from the external device 80 while the control circuits 20, 40, and 70 are in the sleep mode, "the control circuit 70 in the adapter 60", "the control circuit 40 in the electric power tool 30", and "the control circuit 20 in the battery pack 10" sequentially switch to the active mode, and thereby the entire electric power tool system is activated.

When the main switch 38 is operated while the control circuits 20, 40, and 70 are in the sleep mode, a second wakeup signal S2 is outputted from the main switch 38 to the control circuit 40 in the electric power tool 30.

Then, the control circuit 40 wakes up by a wakeup circuit in the control circuit 40 and switches to the active mode to execute a predetermined control process.

After switching to the active mode, the control circuit 40 transmits a third wakeup signal S3 to the control circuit 70 in the adapter 60 through the communication path passing through the terminals 53 and 63, and also transmits a fourth wakeup signal S4 to the control circuit 20 in the battery pack 10 through the communication path passing through the terminals 33, 13.

As a result, the control circuits 70 and 20 wake up by respective wakeup circuits in the control circuits 70 and 20, respectively, and switch to the active mode to execute respective predetermined control processes.

According to the electric power tool system of the first embodiment, therefore, when the main switch 38 provided in the electric power tool 30 is operated while the control circuits 20, 40, and 70 are in the sleep mode, the control circuit 40 in the electric power tool 30 first switches to the active mode. Subsequently, the control circuit 70 in the adapter 60 and the control circuit 20 in the battery pack 10 each switch to the active mode, and thereby the entire electric power tool system is activated.

According to the first embodiment, the communication path between the control circuit 70 and the control circuit 40, and the communication path between the control circuit 40 and the control circuit 20 are used to transmit wakeup signals in order to switch the control circuits 20, 40, and 70 from the sleep mode to the active mode. Thus, it is not necessary to provide any separate signal path for transmitting a wakeup signal, which allows a simplified configuration of the electric power tool system.

A description will be next given of a state switching process that is executed as one of main routines in each of the control circuits 20, 40, and 70 to switch the operation mode of each of the control circuits 20, 40, and 70 as described above with reference to flowcharts shown in FIG. 2 to FIG. 4.

Figure 2:
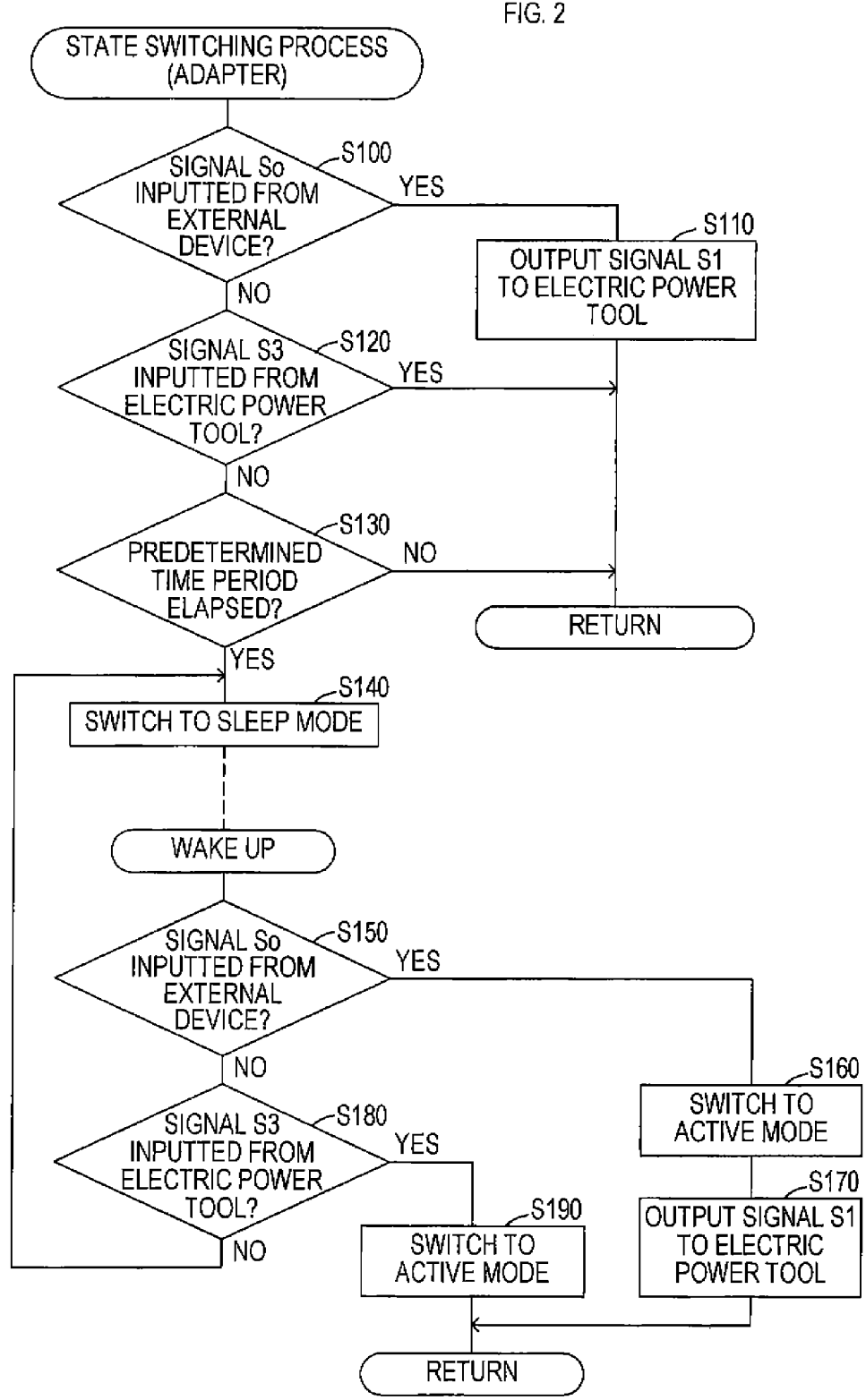
FIG. 2 is a flowchart showing a state switching process in an adaptor of the first embodiment.

FIG. 2 shows the state switching process executed in the control circuit 70 of the adapter 60. As shown in FIG. 2, in the state switching process executed in the control circuit 70 in the adapter 60, it is first determined in S100 (S represents "Step") whether an external wakeup signal So from the external device 80 has been received by the wireless communication unit 68 based on a received signal inputted from the wireless communication unit 68 through the communication path.

If an external wakeup signal So from the external device 80 has been received by the wireless communication unit 68, the present process proceeds to S110, in which a first wakeup signal S1 is outputted to the electric power tool 30 through the communication path. Then, the present state switching process is terminated.

Since the state switching process is executed as one of the main routines, the state switching process will be executed from S100 again after a predetermined time period has elapsed unless the control circuit 70 is in the sleep mode.

On the other hand, if it is determined in S100 that an external wakeup signal So from the external device 80 has not been received, the present process proceeds to S120, in which it is determined whether a third wakeup signal S3 has been transmitted from the electric power tool 30 through the communication path.

If it is determined in S120 that a third wakeup signal S3 has been transmitted from the electric power tool 30, the present state switching process is terminated. If it is determined in S120 that a third wakeup signal S3 has not been transmitted from the electric power tool 30, the present process proceeds to S130.

In S130, it is determined whether the "No" state in S100 and S120 has continued for a predetermined time period or more. If the predetermined time period has not elapsed, the present state switching process is terminated; if the predetermined time period has elapsed, the present process proceeds to S140.

In S140, it is determined that conditions for switching to the sleep mode have been satisfied since signal transmission from the external device 80 and operation of the main switch 38 have been stopped for the predetermined time period or more, and the operation mode of the control circuit 70 is switched from the normal active mode to the sleep mode.

Specifically, a CPU in the control circuit 70 stops execution of a control process (a main routine) including the present state switching process, to thereby reduce power consumption in the control circuit 70. In the sleep mode, although the control circuit 70 stops execution of the control process, the control circuit 70 wakes up, as described above, when an internal wakeup signal Si from the wireless communication unit 68 or a third wakeup signal S3 from the control circuit 40 in the electric power tool 30 is inputted to the control circuit 70.

After waking up, the control circuit 70 determines in S150 whether the current wakeup is due to an external wakeup signal So from the external device 80. If the current wakeup is due to an external wakeup signal So, the present process proceeds to S160.

In S160, the operation mode of the control circuit 70 is switched from the sleep mode to the active mode since the current wakeup is not a wakeup due to noise but a normal one.

Subsequently, in S170, a first wakeup signal S1 is outputted to the electric power tool 30 through the communication path, and then the present state switching process is terminated.

On the other hand, if it is determined in S150 that the current wakeup is not due to an external wakeup signal So, the present process proceeds to S180. In S180, it is determined whether the current wakeup is due to a third wakeup signal S3 from the electric power tool 30.

When the current wakeup is due to a third wakeup signal S3, the present process proceeds to S190 since the current wakeup is not a wakeup clue to noise but a normal one. In S190, the operation mode of the control circuit 70 is switched from the sleep mode to the active mode, and then the present state switching process is terminated.

If it is determined in S180 that the current wakeup is not a wakeup due to a third wakeup signal S3, the present process returns to S140 since the current wakeup is not a normal one, and the operation mode is switched to the sleep mode.

The control circuit 70 in the adapter 60, which switches its own operation mode in accordance with the aforementioned procedure, automatically performs a switching to the sleep mode when it is not necessary to execute the control process of the main routine, to thereby allow stopping of execution of the control process. When an external wakeup signal So is transmitted from the external device 80 or when the main switch 38 is operated, the control circuit 70 performs a switching from the sleep mode to the active mode, to thereby allow restarting of the control process of the main routine.

Figure 3:
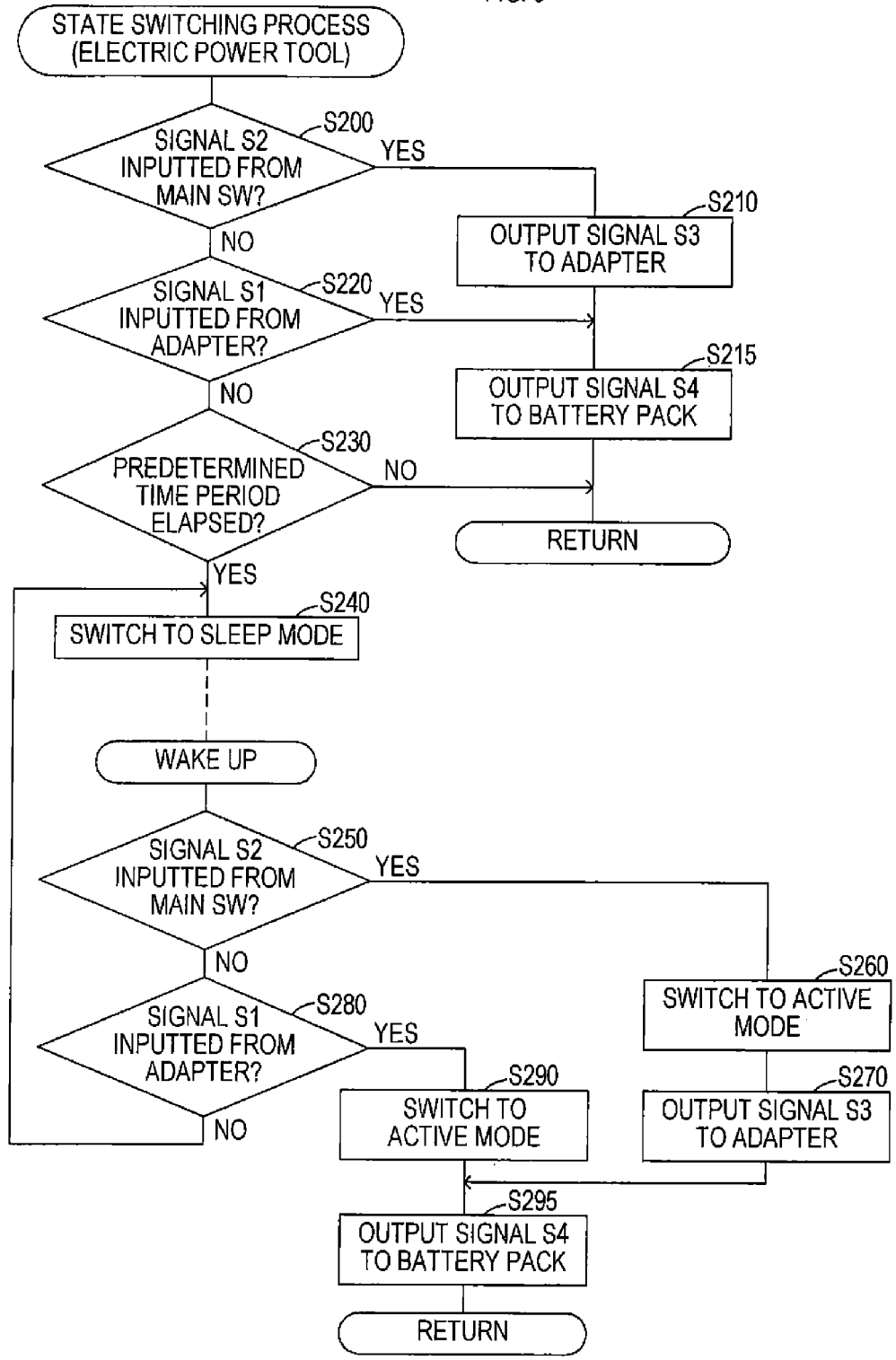
FIG. 3 is a flowchart showing a state switching process in an electric power tool of the first embodiment.

FIG. 3 shows a state switching process executed in the control circuit 40 in the electric power tool 30. As shown in FIG. 3, in the state switching process executed in the control circuit 40 in the electric power tool 30, it is first determined in S200 whether the main switch 38 has been operated by a user and become an ON-state.

In a case where the main switch 38 has become the ON-state, the present process proceeds to S210, in which a third wakeup signal S3 is outputted to the control circuit 70 in the adapter 60 through the communication path.

Subsequently, in S215, a fourth wakeup signal S4 is outputted to the control circuit 20 in the battery pack 10 through the communication path, and then the present state switching process is terminated.

Since the state switching process is executed as one of the main routines, the state switching process will be executed from S200 again after a predetermined time period has elapsed unless the control circuit 40 is in the sleep mode.

On the other hand, if it is determined in S200 that the main switch 38 is not in the ON-state, the present process proceeds to S220, in which it is determined whether a first wakeup signal S1 has been transmitted from the adapter 60 through the communication path.

If it is determined in S220 that a first wakeup signal S1 has been transmitted from the adapter 60, a fourth wakeup signal S4 is outputted to the control circuit 20 in the battery pack 10 through the communication path in S215, and then the present state switching process is terminated.

If it is determined in S220 that a first wakeup signal S1 has not been transmitted from the adapter 60, the present process proceeds to S230.

In S230, it is determined whether the "No" state determined in S200 and S220 has continued for a predetermined time period or more. If the predetermined time period has not elapsed, the present state switching process is terminated, while if the predetermined time period has elapsed, the present process proceeds to S240.

In S240, it is determined that the conditions for switching to the sleep mode have been satisfied, as in the aforementioned S140, and the operation mode of the control circuit 40 is switched from the normal active mode to the sleep mode.

In the sleep mode, although the control circuit 40 stops execution of the control process, the control circuit 40 wakes up, as described above, when a second wakeup signal S2 from the main switch 38 or a first wakeup signal S1 from the control circuit 70 in the adapter 60 is inputted.

After waking up, the control circuit 40 determines in S250 whether the current wakeup is a wakeup due to the main switch 38 being operated and thereby becoming the ON-state (i.e., due to a second wakeup signal S2 from the main switch 38). If the current wakeup is a wakeup due to a second wakeup signal S2, the present process proceeds to S260.

In S260, the operation mode of the control circuit 40 is switched from the sleep mode to the active mode since the current wakeup is a normal one. Subsequently, in S270, a third wakeup signal S3 is outputted to the adapter 60 through the communication path.

If it is determined in S250 that the current wakeup is not a wakeup due to a second wakeup signal S2, the present process proceeds to S280, in which it is determined whether the current wakeup is a wakeup due to a first wakeup signal S1 from the adapter 60.

If the current wakeup is due to a first wakeup signal S1, the present process proceeds to S290 since the current wakeup is a normal one. In S290, the operation mode of the control circuit 40 is switched from the sleep mode to the active mode.

When the operation mode of the control circuit 40 is switched to the active mode in S290, or a third wakeup signal S3 is outputted to the adapter 60 in S270, the present process proceeds to S295.

In S295, a fourth wakeup signal S4 is outputted to the control circuit 20 in the battery pack 10 through the communication path, and then the present state switching process is terminated.

If it is determined in S280 that the current wakeup is not a wakeup due to a first wakeup signal S1 from the adapter 60, the present process returns to S240 since the current wakeup is not a normal one, and the operation mode is switched to the sleep mode.

As described above, the control circuit 40 in the electric power tool 30, which switches its own operation mode in accordance with the aforementioned procedure, automatically performs a switching to the sleep mode when it is not necessary to execute the control process of the main routine, to thereby allow stopping of execution of the control process.

Also, when the main switch 38 is operated or when an external wakeup signal So is transmitted from the external device 80, the control circuit 40 performs a switching from the sleep mode to the active mode, to thereby allow restarting of the control process of the main routine.

Figure 4:
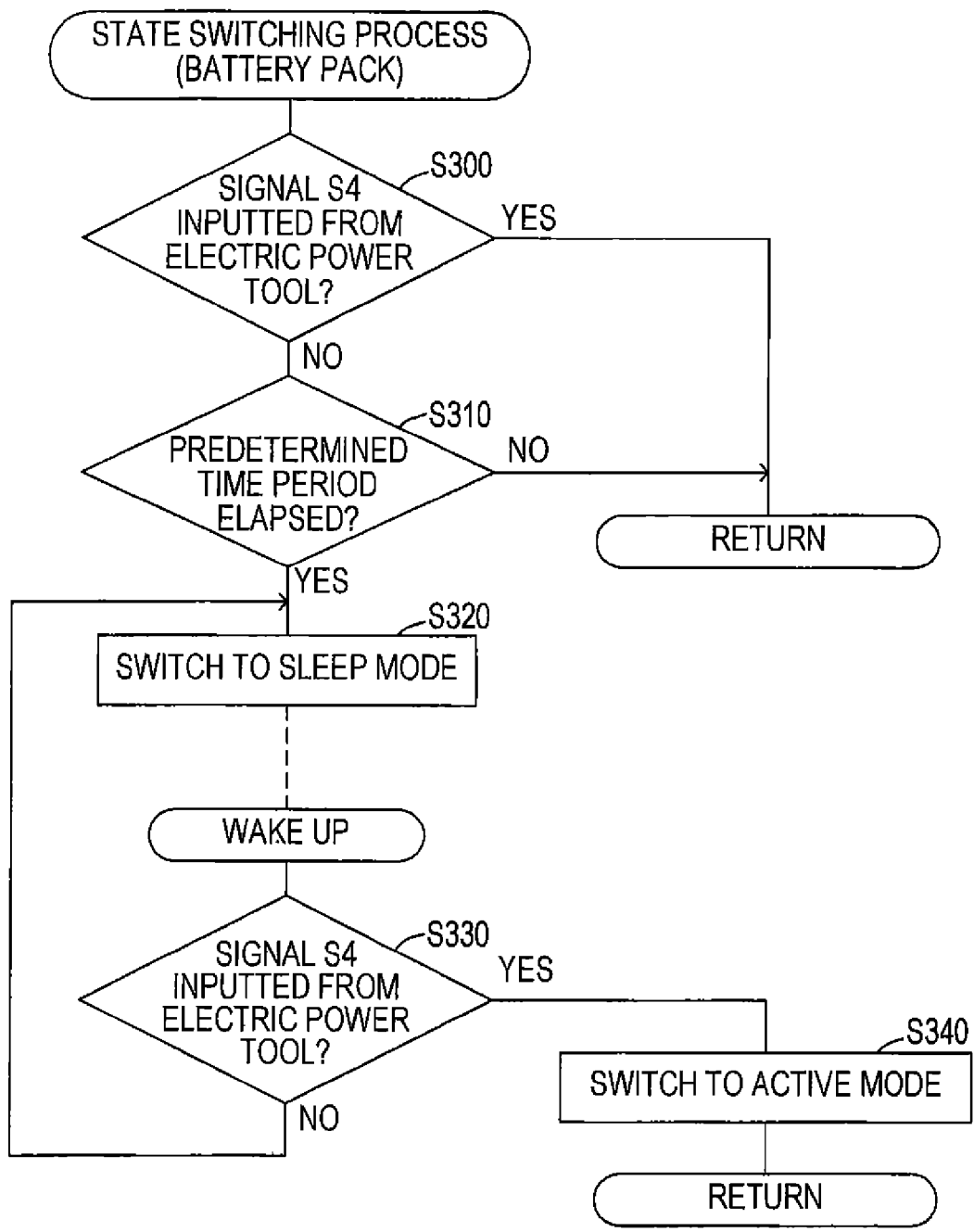
FIG. 4 is a flowchart showing a state switching process in a battery pack of the first embodiment.

FIG. 4 shows a state switching process executed in the control circuit 20 in the battery pack 10. In the state switching process executed in the control circuit 20 in the battery pack 10, as shown in FIG. 4, it is first determined in S300 whether a fourth wakeup signal S4 has been transmitted from the electric power tool 30 through the communication path.

If it is determined in S300 that a fourth wakeup signal S4 has been transmitted from the electric power tool 30, the present state switching process is terminated, while if it is determined in S300 that a fourth wakeup signal S4 has not been transmitted from the electric power tool 30, the present process proceeds to S310.

In S310, it is determined whether a state, determined in S300 that a fourth wakeup signal S4 has not been transmitted, has continued for a predetermined time period or more. If the predetermined time period has not elapsed, the present state switching process is terminated, while if the predetermined time period has elapsed, the present process proceeds to S320.

In S320, it is determined that the conditions for switching to the sleep mode have been satisfied as in the aforementioned S140 and S240, and the operation mode of the control circuit 20 is switched from the normal active mode to the sleep mode.

In the sleep mode, although the control circuit 20 stops execution of the control process, the control circuit 20 wakes up, as described above, when a fourth wakeup signal S4 is inputted from the control circuit 40 in the electric power tool 30.

After waking up, the control circuit 20 determines in S330 whether the current wakeup is a wakeup due to a fourth wakeup signal S4 from the electric power tool 30. If the current wakeup is a wakeup due to a fourth wakeup signal S4, the present process proceeds to S340.

In S340, the operation mode of the control circuit 20 is switched from the sleep mode to the active mode since the current wakeup is a normal one, and then the present state switching process is terminated.

On the other hand, if it is determined in S330 that the current wakeup is not a wakeup due to a fourth wakeup signal S4, the present process returns to S320 since the current wakeup is not a normal one, and the operation mode is switched to the sleep mode.

As described above, the control circuit 20 in the battery pack 10, which switches its own operation mode in accordance with the aforementioned procedure, automatically performs a switching to the sleep mode when it is not necessary to execute the control process of the main routine, to thereby allow stopping of the execution of the control process.

Also, when the main switch 38 is operated or when an external wakeup signal So is transmitted from the external device 80, a fourth wakeup signal S4 is inputted from the electric power tool 30, and then the control circuit 20 switches its own operation mode from the sleep mode to the active mode, to thereby allow restarting of the control process of the main routine.

In the first embodiment, the wireless communication unit 68 in the adapter 60 corresponds to an example of a communication unit in the present disclosure, and the main switch 38 provided in the electric power tool 30 corresponds to an example of a switch in the present disclosure.

Also, the control circuit 70 in the adapter 60 corresponds to an example of a first control circuit in the present disclosure, the control circuit 40 in the electric power tool 30 corresponds to an example of a second control circuit in the present disclosure, and the control circuit 20 in the battery pack 10 corresponds to an example of a third control circuit in the present disclosure.

Second Embodiment

Figure 5:
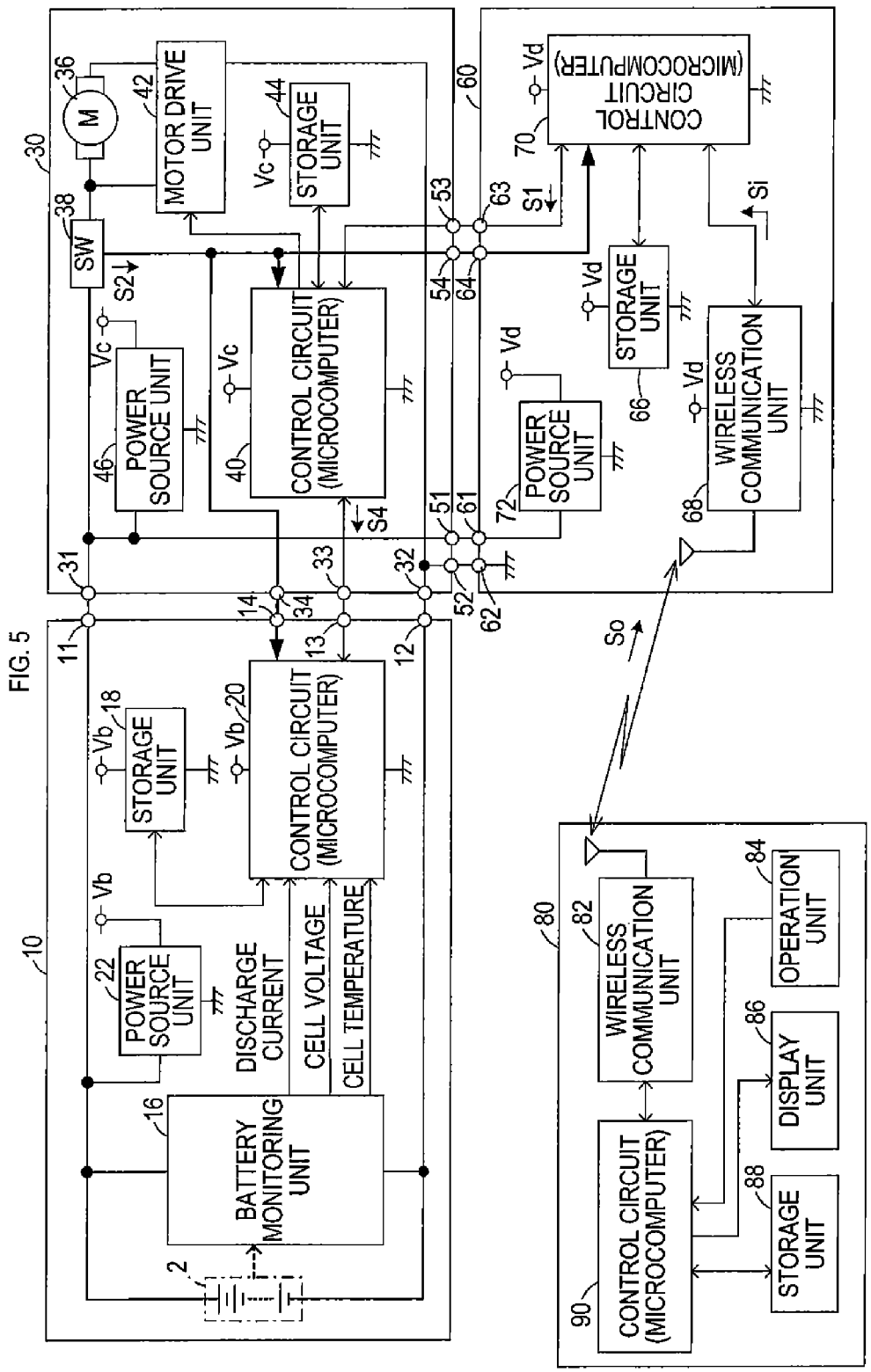
FIG. 5 is a block diagram showing a configuration of an electric power tool system in a second embodiment.

A description of a second embodiment in the present disclosure will be given next. As shown in FIG. 5, a basic configuration of the second embodiment is the same as a basic configuration of the first embodiment. Therefore, hereinafter, a description will be given of differences from the first embodiment and no further description will be given of the same components as in the first embodiment.

In the second embodiment, as shown in FIG. 5, a second wakeup signal S2 that is outputted from the main switch 38 provided in the electric power tool 30 is directly inputted not only to the control circuit 40 in the electric power tool 30, but also to the control circuit 70 in the adapter 60 as well as to the control circuit 20 in the battery pack 10 through dedicated signal paths.

Accordingly, the electric power tool 30 includes a signal path and a terminal 34 to output a second wakeup signal S2 to the battery pack 10, and the battery pack 10 includes a terminal 14 and a signal path to receive a second wakeup signal S2 from the electric power tool 30 and input the received signal to the control circuit 20. The electric power tool 30 also includes a signal path and a terminal 54 to output a second wakeup signal S2 to the adapter 60, and the adapter 60 includes a terminal 64 and a signal path to receive a second wakeup signal S2 from the electric power tool 30 and input the received signal to the control circuit 70.

Each of the control circuits 20, 40, and 70 is configured to wake up, while being in the sleep mode, when a second wakeup signal S2 is inputted from the main switch 38.

Therefore, according to the electric power tool system of the second embodiment, when the main switch 38 is operated while the control circuit 20, 40, and 70 are in the sleep mode, the control circuit 20, 40, and 70 can be simultaneously and rapidly switched to the active mode.

Consequently, according to the electric power tool system of the second embodiment, it is possible, unlike in the electric power tool system of the first embodiment, to suppress the control circuit 20 and 70 from being switched to the active mode in a delayed fashion as compared with the control circuit 40, and thus suppress occurrence of a delayed activation of the entire electric power tool system due to such delay in switching to the active mode, which causes an uncomfortable feeling to a user.

In the electric power tool system of the second embodiment, when an external wakeup signal So is transmitted from the external device 80 while the control circuits 20, 40, and 70 are in the sleep mode, the control circuit 70, the control circuit 40, and the control circuit 20 are switched to the active mode in this order.

Accordingly, it is possible to start communication to be performed among the control circuits 20, 40, and 70 after these control circuits wake up in the aforementioned order (i.e., in the order of starting wakeup) of the control circuits, to thereby facilitate good communication among the control circuits.

Figure 6:
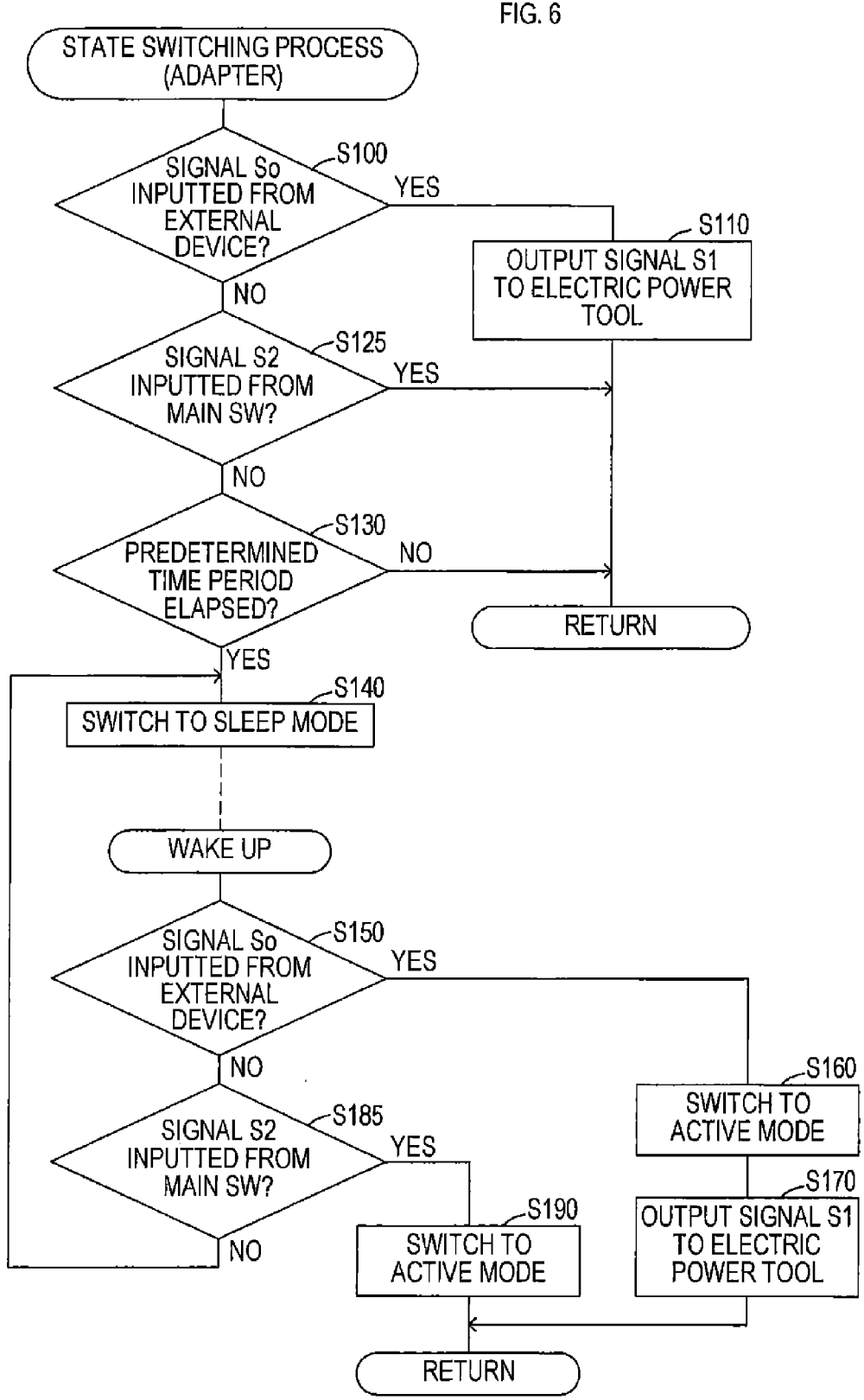
FIG. 6 is a flowchart showing a state switching process in an adaptor of the second embodiment.
Figure 7:
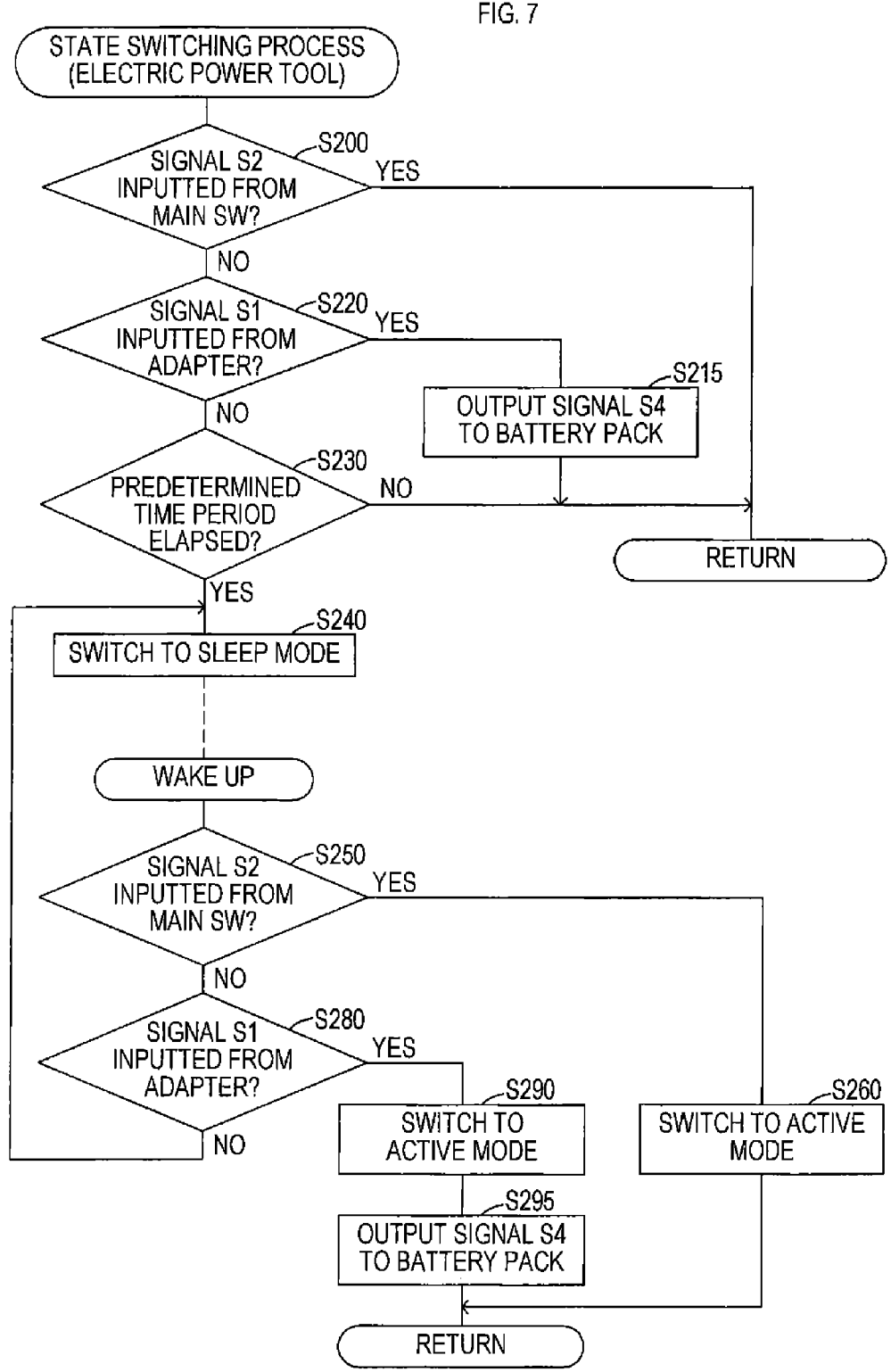
FIG. 7 is a flowchart showing a state switching process in an electric power tool of the second embodiment.
Figure 8:
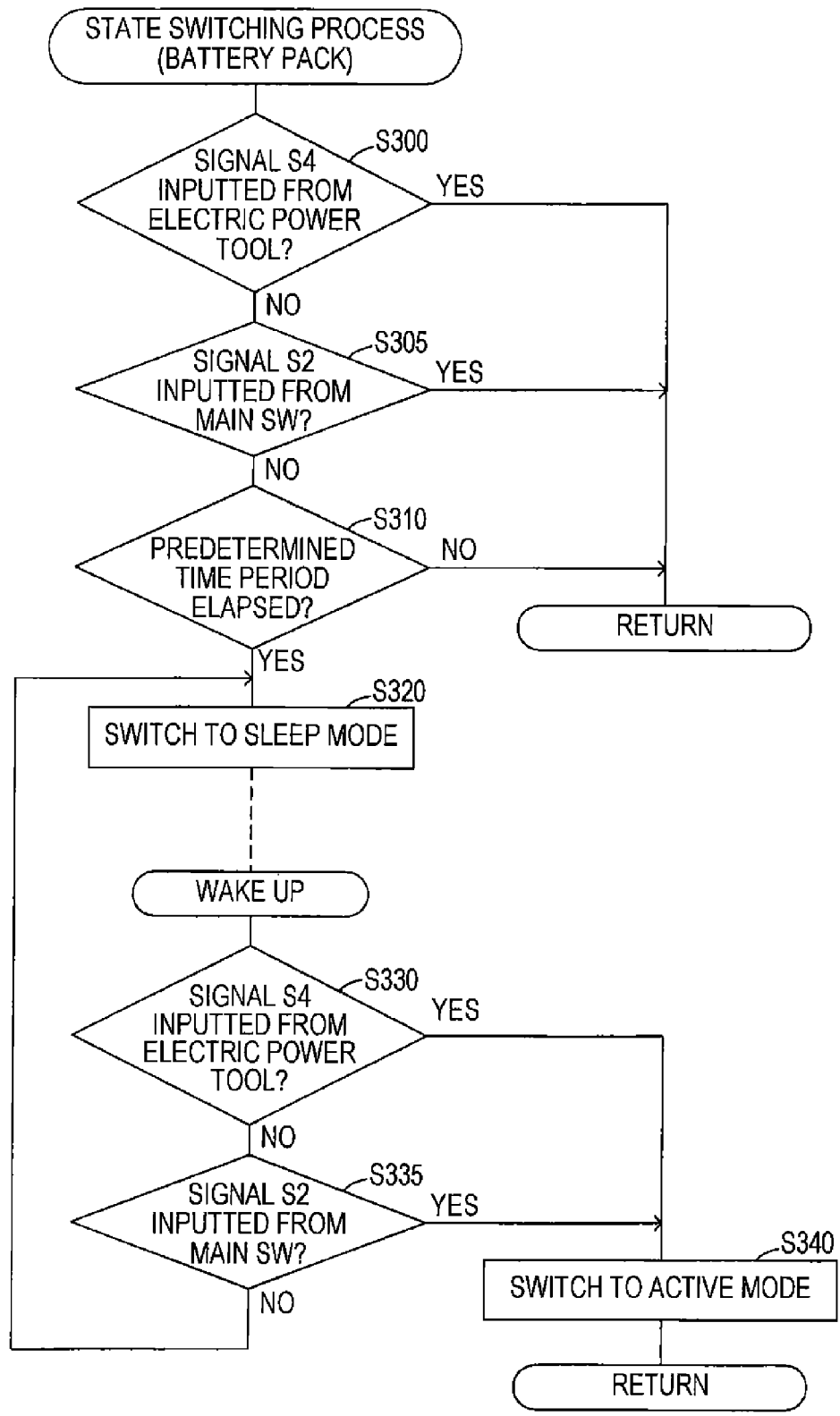
FIG. 8 is a flowchart showing a state switching process in a battery pack of the second embodiment.

In order to allow the control circuits 70, 40, and 20 to wake up in response to a second wakeup signal S2 from the main switch 38 as in the second embodiment, the state switching processes to be executed in the respective control circuits 70, 40, and 20 may be modified as shown in FIG. 6 to FIG. 8, respectively.

Specifically in the state switching process executed in the control circuit 70 in the adapter 60, as shown in FIG. 6, steps (S125, S185) to determine whether a second wakeup signal S2 has been inputted from the main switch 38 are executed in place of the steps in S120 and S180, respectively, in the first embodiment.

If it is determined in S125 that a second wakeup signal S2 has been inputted from the main switch 38, the present state switching process is terminated, while if it is determined that a second wakeup signal S2 has not been inputted from the main switch 38, the present process proceeds to S130.

If it is determined in S185 that a second wakeup signal S2 has been inputted from the main switch 38, the present process proceeds to S190, while if it is determined that a second wakeup signal S2 has not been inputted from the main switch 38, the present process proceeds to S140.

In the state switching process executed in the control circuit 40 in the electric power tool 30, as shown in FIG. 7, the steps in S210 and S270 in the first embodiment are omitted. Specifically, if it is determined in S200 or S250 that a second wakeup signal S2 has been inputted from the main switch 38, the step (8210 or S270) to output a third wakeup signal S3 to the control circuit 70 in the adapter 60 is not executed.

If it is determined in S200 that a second wakeup signal S2 has been inputted from the main switch 38, the step (8215) to output a fourth wakeup signal S4 to the control circuit 20 in the battery pack 10 is not executed, unlike in the first embodiment. That is, the step (8215) of outputting a fourth wakeup signal S4 to the control circuit 20 in the battery pack 10 is executed only when a first wakeup signal S1 is inputted from the control circuit 70 in the adapter 60.

In the state switching process executed in the control circuit 20 in the battery pack 10, as shown in FIG. 8, if it is determined in S300 or S330 that a fourth wakeup signal S4 has not been transmitted from the electric power tool 30, a step (8305 or 8335) to determine whether a second wakeup signal S2 is inputted from the main switch 38 is executed.

If it is determined in S305 that a second wakeup signal S2 has been inputted from the main switch 38, the present state switching process is terminated, while if it is determined that a second wakeup signal S2 has not been inputted from the main switch 38, the present process proceeds to S310.

If it is determined in S335 that a second wakeup signal S2 has been inputted from the main switch 38, the present process proceeds to S340, while if it is determined that a second wakeup signal S2 has not been inputted from the main switch 38, the present process proceeds to S320.

By modifying the state switching processes to be executed in the respective control circuits 20, 40, and 70, it is possible for the control circuits 20, 40, and 70 to automatically switch to the sleep mode when it is unnecessary to execute the control process of the main routine, to thereby stop execution of the control process also in the second embodiment.

Also, when an external wakeup signal So is transmitted from the external device 80 or when the main switch 38 is operated, it is possible for the control circuits 20, 40, and 70 to switch from the sleep mode to the active mode, to thereby restart the control process of the main routine.

Third Embodiment

Figure 9:
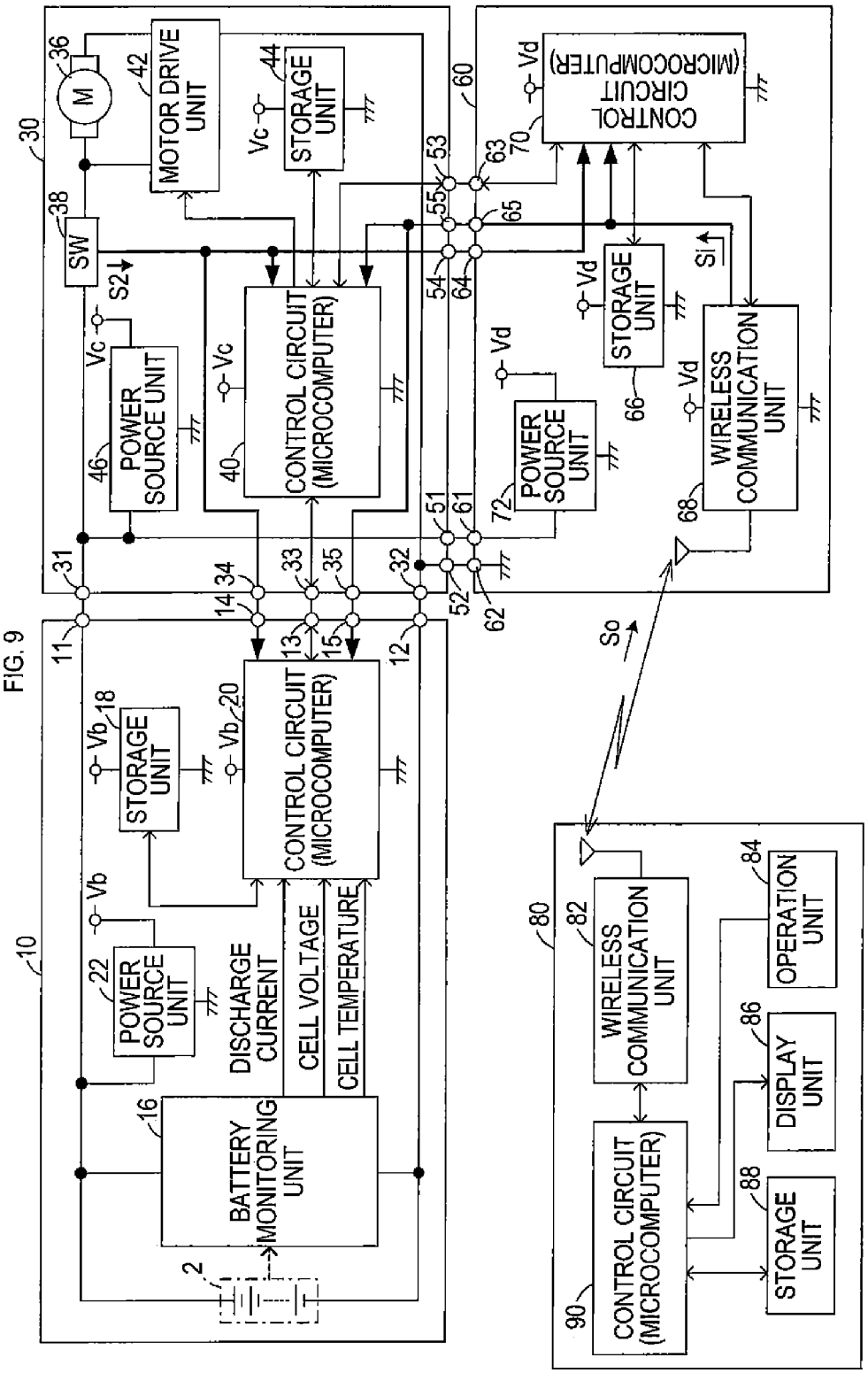
FIG. 9 is a block diagram showing a configuration of an electric power tool system in a third embodiment.

Next, a description of a third embodiment in the present disclosure will be given. As shown in FIG. 9, a basic configuration of the third embodiment is the same as the basic configuration of the second embodiment. Therefore, hereinafter, a description will be given of differences from the second embodiment, and no further description will be given of the same components as in the second embodiment In the third embodiment, as shown in FIG. 9, not only a second wakeup signal S2 outputted from the main switch 38 provided in the electric power tool 30 is directly inputted to each of the control circuits 20, 40, and 70, but also an internal wakeup signal Si outputted from the wireless communication unit 68 in the adapter 60 is directly inputted to each of the control circuits 20, 40, and 70.

Accordingly, the adapter 60 includes a signal path and a terminal 65 to output an internal wakeup signal Si to the electric power tool 30, and the electric power tool 30 includes a terminal 55 and a signal path to receive an internal wakeup signal Si from the adapter 60 and input the received signal to the control circuit 40.

The electric power tool 30 also includes a signal path and a terminal 35 to output an internal wakeup signal Si that is inputted to the terminal 55 to the battery pack 10. The battery pack 10 includes a terminal 15 and a signal path to receive an internal wakeup signal Si from the electric power tool 30 and input the received signal to the control circuit 20.

Accordingly, in the electric power tool system of the third embodiment, it is possible to switch the control circuits 20, 40, and 70 to the active mode substantially simultaneously and also promptly when the main switch 38 is operated or when an external wakeup signal So is transmitted from the external device 80, although it is necessary to provide the signal paths and the terminals 15, 35, 55, and 65 to transmit an internal wakeup signal Si to the control circuits 20, 40, and 70.

Therefore, according to the electric power tool system of the third embodiment, it is possible to shorten a startup time required to switch the control circuits 20, 40, and 70 in the sleep mode to the active mode and thereby activate the entire electric power tool system. Thus, it is possible to suppress giving an uncomfortable feeling to a user that is caused by a delayed activation of the electric power tool system after the user's operation of the main switch 38 or of the external device 80.

In the third embodiment, each of the control circuits 20, 40, and 70 may execute a state switching process shown in FIG. 10. Specifically, it is determined in S400 whether a second wakeup signal S2 from the main switch 38 or an internal wakeup signal Si from the wireless communication unit 68 has been inputted. If it is determined that a second wakeup signal S2 or an internal wakeup signal Si has been inputted, the state switching process is terminated. If it is determined that a second wakeup signal S2 or an internal wakeup signal Si has not been inputted, the present process proceeds to S410, in which it is determined whether a predetermined time period has elapsed.

If it is determined that a predetermined time period has not elapsed, the state switching process is terminated. If it is determined that a predetermined time period has elapsed, the present process proceeds to S420, in which the operation mode is switched to the sleep mode.

If a second wakeup signal S2 or an internal wakeup signal Si is inputted afterward, each of the control circuits 20, 40, and 70 wakes up. When each of the control circuits 20, 40, and 70 wakes up, it is determined in S430 whether the current wakeup is due to a second wakeup signal S2 or an internal wakeup signal Si.

If it is determined that the current wakeup is not due to a second wakeup signal S2 or an internal wakeup signal Si, the present process returns to S420 since the current wakeup is not a normal one, and the operation mode is switched to the sleep mode. If it is determined that the current wakeup is due to a second wakeup signal S2 or an internal wakeup signal Si, the present process proceeds to S440. In S440, the operation mode of each of the control circuits 20, 40, and 70 is switched from the sleep mode to the active mode since the current wakeup is a normal one, and then the state switching process is terminated.

Although exemplary embodiments of the present disclosure have been described as above, the present invention should not be limited to the above-described embodiments, but may be embodied in various forms within a scope not departing from the spirit of the present invention.

For example, although the control circuit 20 and the control circuit 40 communicate with each other using the communication path including the terminal 13 and terminal 33, and the control circuit 40 and the control circuit 70 communicate with each other using the communication path including the terminal 53 and the terminal 63 in the above-described embodiments, non-contact communication by, for example, electromagnetic coupling of coils may be instead employed.

Also, transmission of a second wakeup signal S2 from the main switch 38 to the battery pack 10 and the adapter 60, or transmission of an internal wakeup signal Si from the wireless communication unit 68 to the electric power tool 30 and the battery pack 10 in the second embodiment and the third embodiment may be performed by non-contact communication by, for example, electromagnetic coupling of coils.

Further, in the third embodiment, a second wakeup signal S2 from the main switch 38 and an internal wakeup signal Si from the wireless communication unit 68 are directly inputted to the control circuits 20, 40, and 70. However, it may be configured such that a second wakeup signal S2 from the main switch 38 is inputted only to the control circuit 40 in the same manner as in the first embodiment, and the control circuit 40 that has received the second wakeup signal S2 outputs wakeup signals (i.e., a fourth wakeup signal S4 and a third wakeup signal S3) to the remaining control circuits 20 and 70, respectively.

Although the motor-driven appliance system in each of the above-described embodiments includes the electric power tool 30 and the battery pack 10, the motor-driven appliance system may be one including an electric power tool that operates by receiving power supply from a commercial power source, or may be one including a motor-driven appliance other than an electric power tool (for example, an electric work machine).

Also, in the above-described embodiments, the wireless communication unit 68 that performs wireless communication with the external device 80 is housed in the adapter 60 configured separately from the electric power tool 30, and is detachably attached to the electric power tool 30. However, the wireless communication unit 68 and the control circuit 70 in the adapter 60 may be provided in the electric power tool 30 (in other words, in the motor-driven appliance).

What is claimed is:

1. A motor-driven appliance system, comprising:
    a motor-driven appliance having a motor;
    at least one control circuit configured to execute a process related to control of the motor-driven appliance; and
    a communication device configured to communicate with an external device,
    wherein the at least one control circuit is further configured to switch from an active mode to a sleep mode when at least one predetermined sleep condition is satisfied; and wherein the at least one control circuit is further configured to switch to the active mode when the communication device receives an external wakeup signal transmitted from the external device while the at least one control circuit is in the sleep mode, the active mode being a mode in which the at least one control circuit performs a normal operation, and the sleep mode being a mode in which the at least one control circuit is powered by at least one power source unit and in which the at least one control circuit stops part of the normal operation to thereby suppress but not stop power consumption in the at least one control circuit.

2. The motor-driven appliance system according to claim 1,
    wherein the at least one control circuit includes a first control circuit and a second control circuit,
        the first control circuit being configured to switch to the active mode when the communication device receives the external wakeup signal while the first control circuit is in the sleep mode, and to output a first wakeup signal to the second control circuit, and
        the second control circuit being configured to switch to the active mode when the second control circuit receives the first wakeup signal from the first control circuit while the second control circuit is in the sleep mode.

3. The motor-driven appliance system according to claim 2,
    wherein the motor-driven appliance includes a switch configured to be operated by a user of the motor-driven appliance, the switch being further configured to output a second wakeup signal to the second control circuit when operated by the user,
    wherein the second control circuit is configured to switch to the active mode when receiving the second wakeup signal from the switch while the second control circuit is in the sleep mode, and to output a third wakeup signal to the first control circuit,
    wherein the first control circuit is configured to switch to the active mode when receiving the third wakeup signal from the second control circuit while the first control circuit is in the sleep mode, and
    wherein the second control circuit is configured to output the third wakeup signal to the first control circuit through a same signal path as a signal path, through which the first control circuit outputs the first wakeup signal to the second control circuit.

4. The motor-driven appliance system according to claim 3,
    wherein the switch is configured to be operated by the user in order to drive the motor.

5. The motor-driven appliance system according to claim 3,
    wherein the at least one control circuit further includes a third control circuit, wherein the second control circuit is configured to output a fourth wakeup signal to the third control circuit when the second control circuit switches from the sleep mode to the active mode, and wherein the third control circuit is configured to switch to the active mode when the third control circuit receives the fourth wakeup signal from the second control circuit while the third control circuit is in the sleep mode.

6. The motor-driven appliance system according to claim 2, wherein the at least one control circuit further includes a third control circuit, wherein the second control circuit is configured to output a fourth wakeup signal to the third control circuit when the second control circuit switches from the sleep mode to the active mode, and wherein the third control circuit is configured to switch to the active mode when the third control circuit receives the fourth wakeup signal from the second control circuit while the third control circuit is in the sleep mode.

7. The motor-driven appliance system according to claim 2, wherein the motor-driven appliance includes a switch configured to be operated by a user of the motor-driven appliance, the switch being further configured to directly input a second wakeup signal to each of the first control circuit and the second control circuit when operated by the user, wherein the each of the first control circuit and the second control circuit is configured to switch to the active mode when receiving the second wakeup signal from the switch while the each of the first control circuit and the second control circuit is in the sleep mode.

8. The motor-driven appliance system according to claim 1, wherein the at least one control circuit includes a first control circuit and a second control circuit, wherein the communication device is configured to directly input an internal wakeup signal to each of the first control circuit and the second control circuit when receiving the external wakeup signal transmitted from the external device, and wherein the each of the first control circuit and the second control circuit is configured to switch to the active mode when receiving the internal wakeup signal from the communication device while the each of the first control circuit and the second control circuit is in the sleep mode.

9. The motor-driven appliance system according to claim 8, wherein the motor-driven appliance includes a switch configured to be operated by a user of the motor-driven appliance, wherein the each of the first control circuit and the second control circuit is configured to switch to the active mode when the switch is operated by the user while the each of the first control circuit and the second control circuit is in the sleep mode.

10. The motor-driven appliance system according to claim 9, wherein the switch is configured to be operated by the user in order to drive the motor.

11. The motor-driven appliance system according to claim 1, wherein the at least one control circuit comprises a first control circuit and a second control circuit, the first control circuit being provided in the motor-driven appliance, and the second control circuit being provided in the communication device, wherein the at least one power source unit comprises a first power source unit and a second power source unit, the first power source unit being provided in the motor-driven appliance, and the second power source unit being provided in the communication device, wherein the first control circuit is powered by the first power source unit, and wherein the second control circuit is powered by the second power source unit.

12. The motor-driven appliance system according to claim 8, wherein the at least one control circuit further includes a third control circuit, the third control circuit being configured to switch to the active mode in conjunction with switching of the each of the first control circuit and the second control circuit to the active mode while the third control circuit is in the sleep mode.

13. The motor-driven appliance system according to claim 9, wherein the at least one control circuit further includes a third control circuit, the third control circuit being configured to switch to the active mode in conjunction with switching of the each of the first control circuit and the second control circuit to the active mode while the third control circuit is in the sleep mode.

14. A method for controlling a motor-driven appliance system including a motor-driven appliance having a motor, at least one control circuit configured to execute a process related to control of the motor-driven appliance, and a communication device configured to communicate with an external device, the method comprising:

switching the at least one control circuit from an active mode to a sleep mode when at least one predetermined sleep condition is satisfied, the active mode being a mode in which the at least one control circuit performs a normal operation, and the sleep mode being a mode in which the at least one control circuit is powered by a power source unit and in which the at least one control circuit stops part of the normal operation to thereby suppress but not stop power consumption in the at least one control circuit;

receiving an external wakeup signal transmitted from the external device through the communication device; and switching the at least one control circuit to the active mode when the external wakeup signal transmitted from the external device is received through the communication device while the at least one control circuit is in the sleep mode.

15. The method according to claim 14, wherein the motor-driven appliance includes a switch configured to be operated by a user of the motor-driven appliance, the method further comprising:

switching the at least one control circuit to the active mode when the switch is operated while the at least one control circuit is in the sleep mode.

16. The method according to claim 15, wherein the switch is configured to be operated by the user in order to drive the motor.

17. The method according to claim 14, wherein the at least one control circuit comprises a first control circuit and a second control circuit, the first control circuit being provided in the motor-driven appliance, and the second control circuit being provided in the communication device, wherein the at least one power source unit comprises a first power source unit and a second power source unit, the first power source unit being provided in the motor-driven appliance, and the second power source unit being provided in the communication device, wherein the first control circuit is powered by the first power source unit, and wherein the second control circuit is powered by the second power source unit.

18. A motor-driven appliance system, comprising:

a motor-driven appliance having a motor;

at least one control circuit configured to execute a process related to control of the motor-driven appliance; and a communication device configured to communicate with an external device, wherein:

the at least one control circuit is further configured to switch, when at least one predetermined sleep condition is satisfied, from an active mode in which the at least one control circuit performs a normal operation to a sleep mode in which the at least one control circuit stops part of the normal operation to thereby suppress power consumption; and to switch to the active mode when the communication device receives an external wakeup signal transmitted from the external device while the at least one control circuit is in the sleep mode, the at least one control circuit includes a first control circuit and a second control circuit, the communication device is configured to directly input an internal wakeup signal to each of the first control circuit and the second control circuit when receiving the external wakeup signal transmitted from the external device, and the each of the first control circuit and the second control circuit is configured to switch to the active mode when receiving the internal wakeup signal from the communication device while the each of the first control circuit and the second control circuit is in the sleep mode.

* * * * *